United States Patent
Hu et al.

(10) Patent No.: US 8,385,724 B2
(45) Date of Patent: Feb. 26, 2013

(54) CONTROLLING DEVICE OF A LIQUID CRYSTAL DISPLAY

(75) Inventors: Tsung-Hsing Hu, Hsinchu (TW); Wei-Chen Su, Tainan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1195 days.

(21) Appl. No.: 11/858,116

(22) Filed: Sep. 19, 2007

(65) Prior Publication Data

US 2008/0273864 A1    Nov. 6, 2008

(30) Foreign Application Priority Data

May 2, 2007    (TW) .............................. 96115634 A

(51) Int. Cl.
*H04N 9/70* (2006.01)
(52) U.S. Cl. ........................................ 386/300; 386/312
(58) Field of Classification Search .................... 345/60, 345/76, 82, 83, 87, 88, 98; 348/571–574
See application file for complete search history.

(56) References Cited

U.S. PATENT DOCUMENTS

| | | | | |
|---|---|---|---|---|
| 5,226,063 A | * | 7/1993 | Higashitsutsumi | 377/44 |
| 5,341,218 A | * | 8/1994 | Kaneko et al. | 348/695 |
| 6,314,074 B1 | * | 11/2001 | Kuribayashi | 369/124.05 |
| 6,380,980 B1 | | 4/2002 | Huang | |
| 2002/0047924 A1 | * | 4/2002 | Huang | 348/549 |
| 2002/0075529 A1 | * | 6/2002 | Sato et al. | 358/505 |
| 2005/0062691 A1 | * | 3/2005 | Tamura et al. | 345/76 |
| 2007/0165122 A1 | * | 7/2007 | Tsumura et al. | 348/257 |
| 2008/0129279 A1 | * | 6/2008 | Gallavan | 324/123 R |
| 2009/0020704 A1 | * | 1/2009 | Wellnitz | 250/369 |

FOREIGN PATENT DOCUMENTS

| | | | |
|---|---|---|---|
| EP | 0178044 | * | 4/1986 |
| TW | I260577 | | 8/2006 |
| TW | I272775 | | 2/2007 |

OTHER PUBLICATIONS

"Office Action of Taiwan Counterpart Application", issued on Nov. 23, 2011, p. 1-4, in which the listed references were cited.

* cited by examiner

*Primary Examiner* — William C Vaughn, Jr.
*Assistant Examiner* — Eileen Adams
(74) *Attorney, Agent, or Firm* — Jianq Chyun IP Office

(57) ABSTRACT

A controlling device of a liquid crystal display is provided. The controlling device includes an A/D interface, a sampler, and a shift error correction circuit. An input end of the A/D interface receives an analog video signal for being converted, so as to output a digital video color level. The sampler is coupled between a reference potential and the input end of the A/D interface, and a controlling end of the sampler receives a correction signal. The shift error correction circuit receives the digital video color level, the correction signal, and a target value corresponding to the reference potential. When the correction signal is enabled, the sampler is ON, and the shift error correction circuit performs a correction operation on the received digital video color level and the target value to get a correction value for the A/D interface that corrects the conversion error of the A/D interface.

18 Claims, 4 Drawing Sheets

CONTROLLING DEVICE OF A LIQUID CRYSTAL DISPLAY

CROSS-REFERENCE TO RELATED APPLICATION

This application claims the priority benefit of Taiwan application serial no. 96115634, filed May 2, 2007. All disclosure of the Taiwan application is incorporated herein by reference.

BACKGROUND OF THE INVENTION

1. Field of the Invention

The present invention relates to a controlling device of a liquid crystal display. More particularly, the present invention relates to a controlling device of a liquid crystal display having a function of correcting the video conversion process.

2. Description of Related Art

Referring to FIG. 1, FIG. 1 is a schematic drawing of a conventional controlling device for a liquid crystal display. In the controlling device 100, an analog to digital (A/D) interface 110 directly converts an analog video signal $AV_{IN}$ into a digital video color level signal 112. After being scaled by the image scaling circuit 120, the digital video color level signal 112 is converted into the video scaling signal 122 and transmitted to an interface signal transmission circuit 130, and then transmitted to a display module 140, so as to drive the display to display a corresponding picture.

The characteristics of the A/D interface 110 has a dynamic drift phenomenon along with the changing of the temperature of the working environment and the received power voltage, and thus, the video conversion operation point for the A/D interface 110 has a conversion error. The slightly-changed conversion error causes the pixels of the liquid crystal display to generate an unstable brightness output, and thus, it is difficult to analyze and control.

The controlling device 100 of the liquid crystal display also has slight errors in the manufacturing process, which affects the video conversion operation and the brightness of the liquid crystal display color. For example, when three primary colors including red, green, and blue are displayed by the liquid crystal display, three groups of controlling devices 100 as shown in FIG. 1 are used as the controlling device for the liquid crystal color display with three colors including red, green, and blue. Since each color controlling device has conversion errors, a shift occurs to the white balance outputted by the liquid crystal display, and thus affecting the quality of the displaying image.

SUMMARY OF THE INVENTION

The present invention is directed to a video processing circuit, which utilizes a shift error correction circuit to correct an output of an analog to digital (A/D) interface, so as to effectively eliminate the pixel brightness drift problem when the analog video is converted to digital video.

The present invention is also directed to a shift error correction circuit, which is used together with an A/D interface to correct the conversion error of the A/D interface, and to stabilize the pixel brightness after the video conversion.

The present invention is further directed to a controlling device of a display, which solves the problem of unstable pixel brightness by means of correcting shift errors, and offers a stable image displaying quality.

As embodied and broadly described herein, the present invention provides a video processing circuit, which includes an A/D interface, a sampler, and a shift error correction circuit. An input end of the A/D interface receives an analog video signal for being converted, so as to output a digital video color level. The sampler is coupled between a reference potential and the input end of the A/D interface, and a controlling end of the sampler receives a correction signal. The shift error correction circuit receives the digital video color level, the correction signal, and a target value corresponding to the reference potential. When the correction signal is enabled, the sampler is turned on to couple the reference potential to the input end of the analog to digital interface, and the shift error correction circuit performs a correction operation on the received digital video color level and the target value to get a correction value for being transmitted to the A/D interface for use.

In one embodiment, the video processing circuit further includes a clamping pulse generator, for generating a correction signal at a blanking interval within a cycle period of the horizontal synchronizing signal.

From another point of view, the present invention also provides a shift error correction circuit, which includes a shift error detection circuit, a feedback filter, and an infinite impulse response (IIR) filter. The shift error detection circuit receives a target value and a digital color level average, so as to generate a shift error. The feedback filter is coupled to the shift error detection circuit for calculating and generating a feedback error used for correction according to the shift error. The IIR filter receives a digital video color level and a correction signal. When the correction signal is enabled, the IIR filter generates a digital color level average, and the shift error correction circuit performs a calculation on the feedback error and the target value and outputs a correction value.

The present invention further provides a controlling device of a display, which includes a video processing circuit, an image scaling circuit, and an interface signal transmission circuit. The video processing circuit includes an A/D interface, a sampler, and a shift error correction circuit. An input end of the A/D interface receives an analog video signal for being converted, so as to output a digital video color level. The sampler is coupled between a reference potential and the input end of the A/D interface, and a controlling end of the sampler receives a correction signal. The shift error correction circuit receives the digital video color level, the correction signal, and a target value corresponding to the reference potential. The image scaling circuit is coupled to the video processing circuit for receiving and transmitting the digital video color level. The interface signal transmission circuit is coupled to the image scaling circuit for receiving and transmitting the digital video color level. When the correction signal is enabled, the sampler is turned on to couple the reference potential to the input end of the analog to digital interface. The shift error correction circuit performs a correction operation on the received digital video color level and the target value to get a correction value to be transmitted to the A/D interface for correcting the conversion error.

The present invention uses a structure of correcting the conversion error by the shift error correction circuit, so as to improve the conventional A/D interface and make a correction on the conversion error, and further avoid the obvious drift phenomenon generated along with the changes of the working temperature of the liquid crystal display and the received voltage of the power source. Therefore, the error of the manufacturing process is compensated, so as to solve the drifting problem of the pixel brightness and white balance.

In order to make the aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a video processing circuit, which includes a shift error correction circuit for correcting an output of the A/D interface, so as to effectively eliminate the problem of pixel brightness drift when the analog video is converted to digital video. In one embodiment, the shift error correction circuit is used in an A/D interface for correcting the conversion error for the A/D interface, and stabilizing the pixel brightness after the video conversion.

Figure 1:
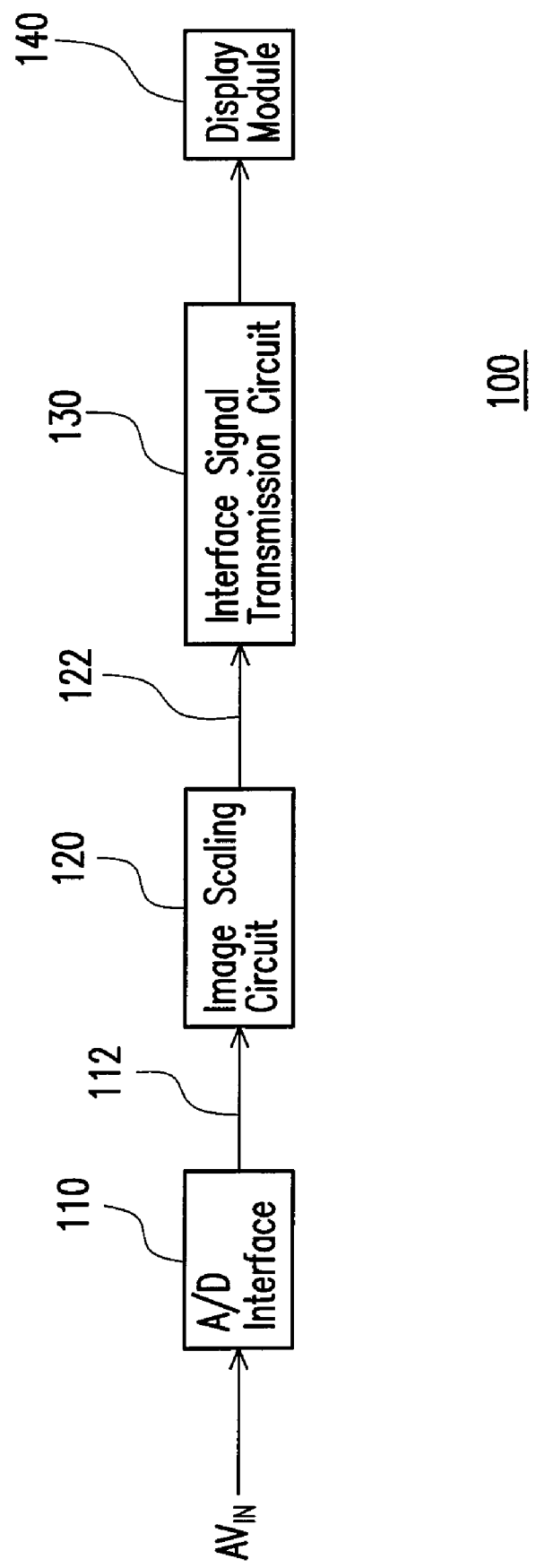
FIG. 1 is a circuit structural view of a conventional controlling device of a liquid crystal display.
Figure 2:
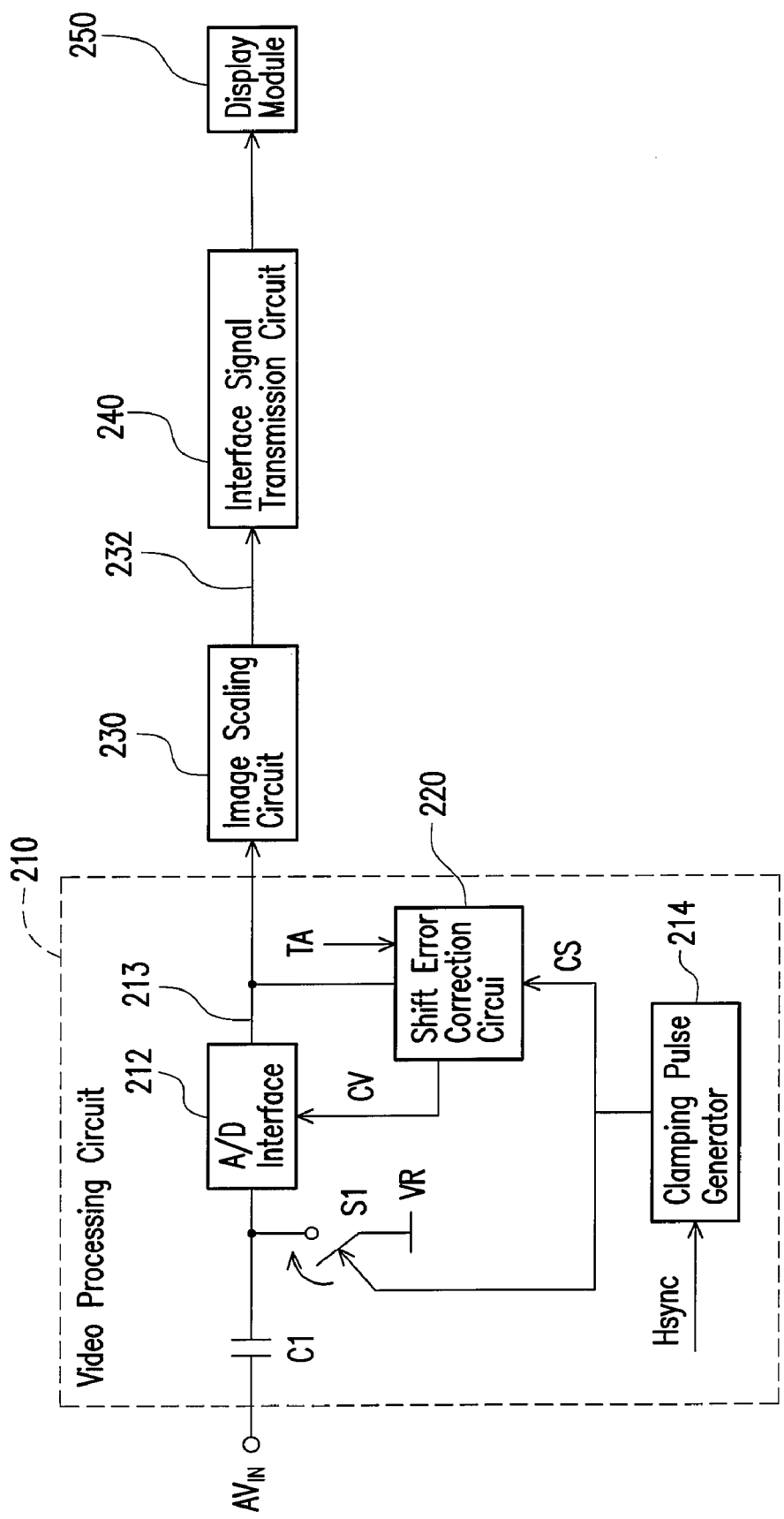
FIG. 2 is a circuit structural view of a controlling device of a liquid crystal display according to an embodiment of the present invention.

FIG. 2 is a schematic circuit structure view of a controlling device of a display according to an embodiment of the present invention. The controlling device of the display includes a video processing circuit 210, an image scaling circuit 230, and an interface signal transmission circuit 250. The video processing circuit 210 receives an analog video signal $AV_{IN}$ and performs an analog to digital converting operation on the received analog video signal $AV_{IN}$, and a digital video color level signal 213 is generated accordingly and as an output of the video processing circuit 210. After being scaled up or down by the image scaling circuit 230, the digital video color level signal 213 is converted into a video scaling signal 232. The video scaling signal 232 is transmitted to an interface signal transmission circuit 240, and then transmitted to a display module 250, so as to display a corresponding picture corresponding to the analog video signal $AV_{IN}$.

In the embodiment of the present invention, the video processing circuit 210 includes an A/D interface 212, a shift error correction circuit 220, a sampler S1, a coupling capacitor C1, and a clamping pulse generator 214. The coupling capacitor C1 is coupled between the analog video signal $AV_{IN}$ and the input end of the A/D interface 212 for blocking the direct current (DC) component of the analog video signal $AV_{IN}$. An input end of the A/D interface 212 receives the alternating current (AC) component of the analog video signal $AV_{IN}$, and the A/D interface 212 performs a video conversion and outputs the corresponding digital video color level signal 213. The clamping pulse generator 214 generates a correction signal CS at an blanking interval with a cycle period of the horizontal synchronizing signal (Hsync for short). The sampler S1 is coupled between a specific reference potential VR and the input end of the A/D interface 212, and a controlling end of the sampler S1 receives the correction signal CS for controlling the correction signal CS, so as to be turned on or off. The shift error correction circuit 220 receives the digital video color level signal 213, the correction signal CS, and a digital color level target value (referred as TA hereinafter) corresponding to the specific reference potential.

In this embodiment, when the correction signal CS is enabled, the sampler S1 is turned on to couple the reference potential VR to the input end of the A/D interface 212, and the shift error correction circuit 220 performs a correction operation on the received digital video color level signal 213 and the target value TA. After the calculation process, the shift error correction circuit 220 gets a correction value CV for being transmitted to the A/D interface 212 for use. When the correction signal CS is not enabled, the A/D interface 212 is used together with a new correction value CV to correct the conversion error. The corrected A/D interface 212 converts the analog video signal $AV_{IN}$ during the data enable period to get a corrected digital video color level signal 213 for being outputted. Furthermore, the video processing circuit 210 correspondingly adjusts the reference potential VR coupled to the video processing circuit 210 according to the source of the received analog video signal $AV_{IN}$, and meanwhile updates the target value TA corresponding to the reference potential VR, which will be illustrated below in great detail.

Figure 3:
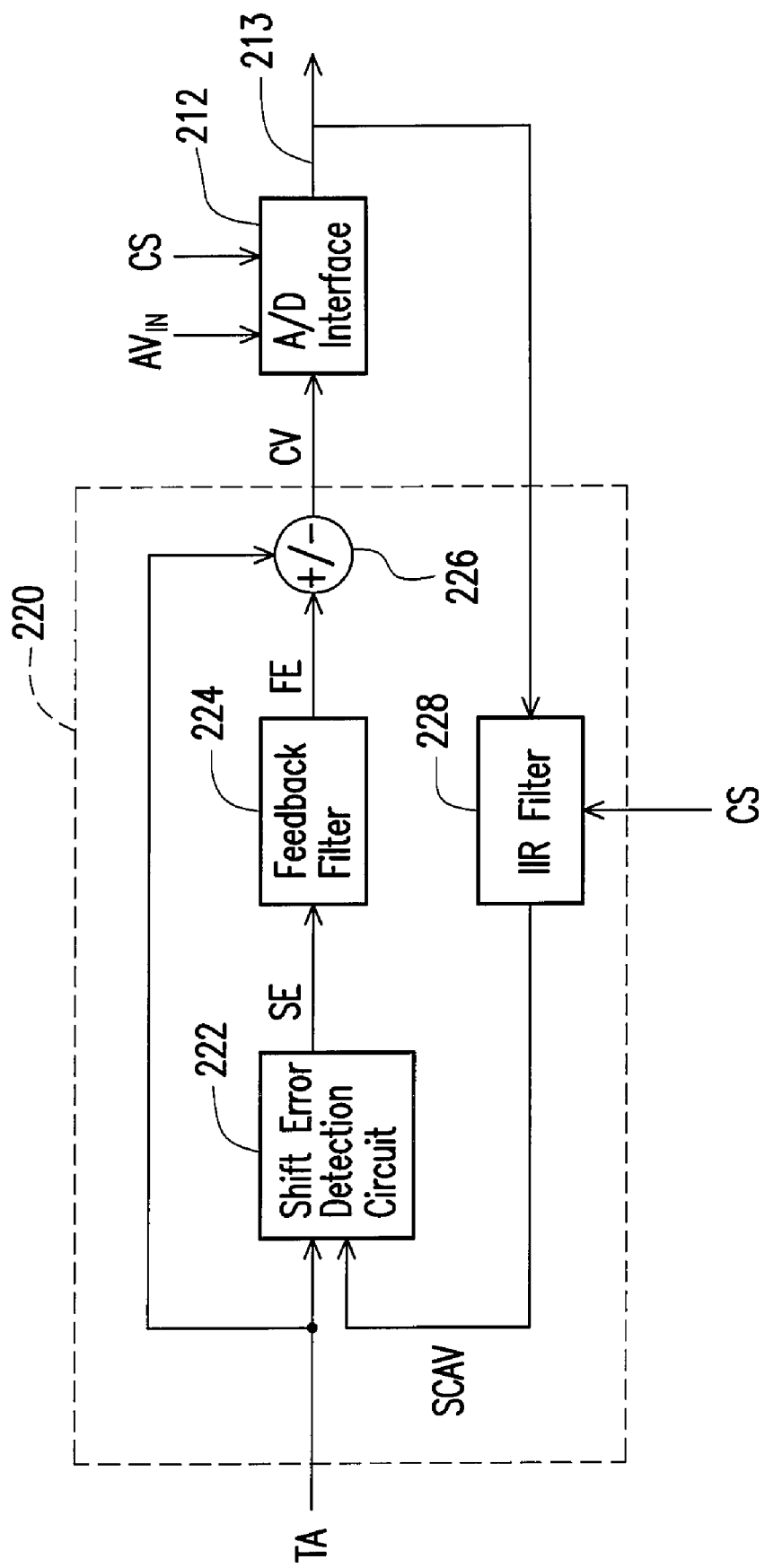
FIG. 3 is a circuit structural view of a shift error correction circuit and an A/D interface according to another embodiment of the present invention.

FIG. 3 is a schematic drawing of a shift error correction circuit 220 and an A/D interface 212 according to an embodiment of the present invention. The shift error correction circuit 220 includes a shift error detection circuit 222, a feedback filter 224, add or subtract processing unit 226, and an infinite impulse response (IIR) filter 228. The shift error detection circuit 222 receives the target value TA and a digital color level output average SCAV produced by the internal calculation of the shift error correction circuit 220, so as to generate a shift error SE. The feedback filter 224 is a second-order filter coupled to the shift error detection circuit 222, and the feedback filter 224 calculates and generates a feedback error FE used for correction according to the shift error SE. When the correction signal CS is enabled, the IIR filter 228 receives the digital video color level signal 213, and calculates to generate the digital color level average SCAV. The shift error correction circuits 220 performs an add/subtract calculation on the feedback error FE and the target value TA through the add/subtract processing unit 226, and outputs a correction value CV to the A/D interface 212, so as to correct the conversion error of the A/D interface 212.

When the analog video signal $AV_{IN}$ is converted to the digital video color level signal 213, the A/D interface 212 uses the correction value CV to correct the output of the digital video color level signal 213. When the video conversion operation of the A/D interface 212 is affected by the rising of temperature of the working environment or the changing of the supplied power voltage, the shift error correction circuit 220 fine adjusts the feedback error FE dynamically, so as to achieve a stable value. The A/D interface 212 performs a correction according to the stabilized correction value CV, converts the analog video signal $AV_{IN}$ during the data enable period, and generates and outputs the digital video color level signal 213.

Figure 4:
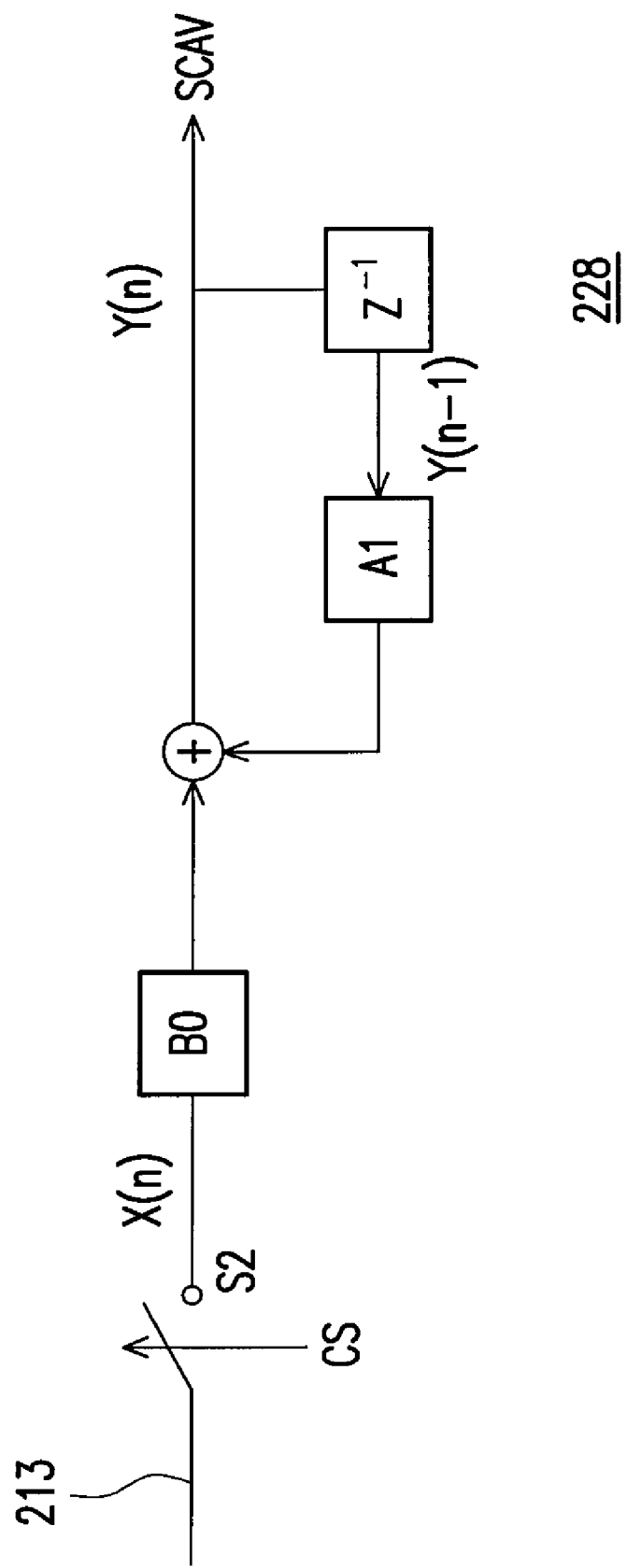
FIG. 4 is a structural view of sampling data for an IIR filter according to another embodiment of the present invention.

Referring to FIGS. 3 and 4 together, FIG. 4 is a structural view of sampling data for an IIR filter 228 according to another embodiment of the present invention. Since the conversion error of the A/D interface 212 shifts gradually instead of changing sharply, the mathematic calculation of the digital color level average SCAV in FIG. 4 is described as follows:

$$Y(n)=A1*Y(n-1)+B0*X(n),$$

wherein A1 is a feedback filter coefficient, B0 is a forward filter coefficient, A1, B0 are constants, $Z^{-1}$ represents that a Z conversion is performed on an IIR sampling operation point by means of a δ function, Y(n) is a sampling output value of the current digital color level average SCAV, Y(n−1) is a sampling output value of the previous (last) digital color level average SCAV, and X(n) is a sampling input value of the current digital video color level signal 213. Therefore, as long as some appropriate parameters are set to the feedback filter coefficient A1 and the forward filter coefficient B0, the shift error correction circuit 220 processes the discrete sampling data, and calculates to get the digital color level average SCAV.

Based on the illustration of the above embodiments, as for the three primary colors including red, green, and blue, three groups of controlling devices of the liquid crystal display as shown in the embodiment of FIG. 2 are used as the liquid crystal color display controlling device with three guns of red, green, and blue. Since the shift error correction circuit for each group of color makes a correction compensation for the conversion errors of the temperature of the working environment and the voltage change, the output brightness of each group of the digital video color level has a stable performance, which also can compensate the pixel brightness shift caused by the errors in the circuit manufacturing process and solve the white balance shift problem.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video processing circuit, comprising:
an analog to digital interface, having an input end for receiving an analog video signal and converting to a digital video color level;
a sampler, coupled between a reference potential and the input end of the analog to digital interface, and having a controlling end for receiving a correction signal;
and a shift error correction circuit, receiving the digital video color level directly from the analog to digital interface, the correction signal, and a target value corresponding to the reference potential for outputting a correction value directly to the analog to digital interface;
a clamping pulse generator that generates the correction signal, directly connected to the sampler and the shift error connection circuit, receiving a horizontal synchronizing signal so as to generate the correction signal at a blanking interval within the horizontal synchronizing signal, sending the correction signal to the shift error connection circuit the and sending the same error correction signal to the sampler to turn the sampler on or off.

2. The video processing circuit as claimed in claim 1, wherein when the correction signal is in a disabled state, the analog to digital interface converts the analog video signal according to the correction value to obtain the digital video color level.

3. The video processing circuit as claimed in claim 1, wherein the video processing circuit further comprises a coupling capacitor, coupled between the input end of the analog to digital interface and the analog video signal, for blocking a direct current component of the analog video signal.

4. The video processing circuit as claimed in claim 1, wherein the video processing circuit adjusts the reference potential according to a source of the analog video signal.

5. The video processing circuit as claimed in claim 4, wherein the target value corresponding to the reference potential is updated when the reference potential is adjusted.

6. The video processing circuit as claimed in claim 1, wherein the shift error correction circuit comprises a shift error detection circuit for receiving the target value and a digital color level average value and generating a shift error according to the target value and the digital color level average value.

7. The video processing circuit as claimed in claim 6, wherein the shift error correction circuit further comprises a feedback filter, coupled to the output of the shift error detection circuit, for generating a feedback error signal according to the shift error and the correction value is generated according to the target value and the feedback error signal.

8. The video processing circuit as claimed in claim 6, wherein the shift error correction circuit further comprises an infinite impulse response (IIR) filter for receiving the digital video color level when the correction signal is enabled, and calculating and generating the digital color level average.

9. A shift error correction circuit, for using in a video processing circuit, wherein the video processing circuit comprises an analog to digital interface for receiving an analog video signal and converting to a digital video color level, the shift error correction circuit comprising:
a shift error detection circuit, receiving a digital color level average directly from the analog to digital interface and a target value for generating a shift error so as to output a correction value directly to the analog to digital interface, wherein the target value is corresponding to a reference potential;
a feedback filter, coupled to the shift error detection circuit, for calculating and generating a feedback error for correction according to the shift error; and
an infinite impulse response (IIR) filter, for receiving a digital video color level and a correction signal, wherein the correction signal is sent out by a clamping pulse generator that generates the correction signal at a blanking interval within a cycle period of a horizontal synchronizing signal;
an add/subtract processing unit directly receiving a feed forward target value and directly receiving the feedback error from the feedback filter and outputting a correction value to the A/D interface so as to correct the conversion error of the A/D interface.

10. A controlling device of a liquid crystal display, comprising: a video processing circuit, comprising:
an analog to digital interface, having an input end for receiving an analog video signal for being converted, so as to output a digital video color level;
a sampler, coupled between a reference potential and the input end of the analog to digital interface, and having a controlling end for receiving a correction signal;
and a shift error correction circuit, receiving the digital video color level directly from the analog to digital interface, the correction signal, and a target value corresponding to the reference potential for outputting a correction value directly to the analog to digital interface;
a clamping pulse generator that generates the correction signal, directly connected to the sampler and the shift error correction circuit, receiving a horizontal synchronizing signal so as to generate the correction signal at a blanking interval within the horizontal synchronizing signal, sending the correction signal to the shift error connection circuit, and sending the same error correction signal to the sampler to turn the sampler on or off;
an image scaling circuit, coupled to the video processing circuit, for receiving and transmitting the digital video color level; and an interface signal transmission circuit, coupled to the image scaling circuit, for receiving and transmitting the digital video color level.

11. The controlling device of the liquid crystal display as claimed in claim 10, wherein when the correction signal is in a disabled state, the analog to digital interface converts the analog video signal according to the correction value to get the digital video color level.

12. The controlling device of the liquid crystal display as claimed in claim 10, wherein the video processing circuit further comprises a clamping pulse generator for generating the correction signal at a blanking interval of a trailing edge changing for a horizontal synchronizing signal.

13. The controlling device of the liquid crystal display as claimed in claim 10, wherein the video processing circuit further comprises an AC-coupling capacitor coupled to the input end of the analog to digital interface for blocking a DC component of the analog video signal.

14. The controlling device of the liquid crystal display as claimed in claim 10, wherein the video processing circuit adjusts the reference potential according to a source of the analog video signal.

15. The controlling device of the liquid crystal display as claimed in claim 14, wherein the target value corresponding to the reference potential is updated when the reference potential is adjusted.

16. The controlling device of the liquid crystal display as claimed in claim 10, wherein the shift error correction circuit comprises a shift error detection circuit for receiving the target value and a digital color level average, so as to generate a shift error.

17. The controlling device of the liquid crystal display as claimed in claim 16, wherein the shift error correction circuit further comprises a feedback filter coupled to the shift error detection circuit, and the shift error detection circuit calculates and generates the correction value according to the shift error.

18. The controlling device of the liquid crystal display as claimed in claim 16, wherein the shift error correction circuit further comprises an IIR filter for receiving the digital video color level when the correction signal is enabled, and calculating and generating the digital color level average.

* * * * *